United States Patent [19]

Neuhouser

[11] 4,368,498

[45] Jan. 11, 1983

[54] GROUND CONDUCTOR MONITORING SYSTEM

[75] Inventor: Donald E. Neuhouser, Huntington, W. Va.

[73] Assignee: Harvey Hubbell Incorporated, Orange, Conn.

[21] Appl. No.: 167,018

[22] Filed: Jul. 9, 1980

Related U.S. Application Data

[63] Continuation of Ser. No. 22,167, Mar. 20, 1979, abandoned.

[51] Int. Cl.³ .............................................. H02H 5/10
[52] U.S. Cl. ..................................... 361/48; 361/113; 340/649; 340/652; 324/51
[58] Field of Search ..................................... 361/47–50, 361/45, 113, 44, 42; 324/51; 340/649, 650, 652, 186, 310 R, 310 A

[56] References Cited

U.S. PATENT DOCUMENTS

| | | |
|---|---|---|
| 2,880,377 | 3/1959 | Buckingham et al. |
| 3,387,064 | 6/1968 | Joy et al. |
| 3,746,929 | 7/1973 | Kotheimer |
| 3,783,340 | 1/1974 | Becker |
| 3,825,915 | 7/1974 | Dow .................................... 340/649 |
| 3,840,782 | 10/1974 | Monaghan ...................... 324/51 X |
| 4,016,429 | 4/1977 | Vercellotti et al. ......... 340/310 R X |
| 4,075,675 | 2/1978 | Burkett et al. ........................ 361/48 |
| 4,142,143 | 2/1979 | Daniel .................................. 324/51 |
| 4,153,923 | 5/1979 | Graf ..................................... 361/48 |

FOREIGN PATENT DOCUMENTS 178 of 1913 United Kingdom.

Primary Examiner—Patrick R. Salce
Attorney, Agent, or Firm—Jerry M. Presson

[57] ABSTRACT

Disclosed is a ground conductor monitoring system which makes efficient use of an audio signal to continuously check the continuity of at least the ground conductor of a cable system.

6 Claims, 1 Drawing Figure

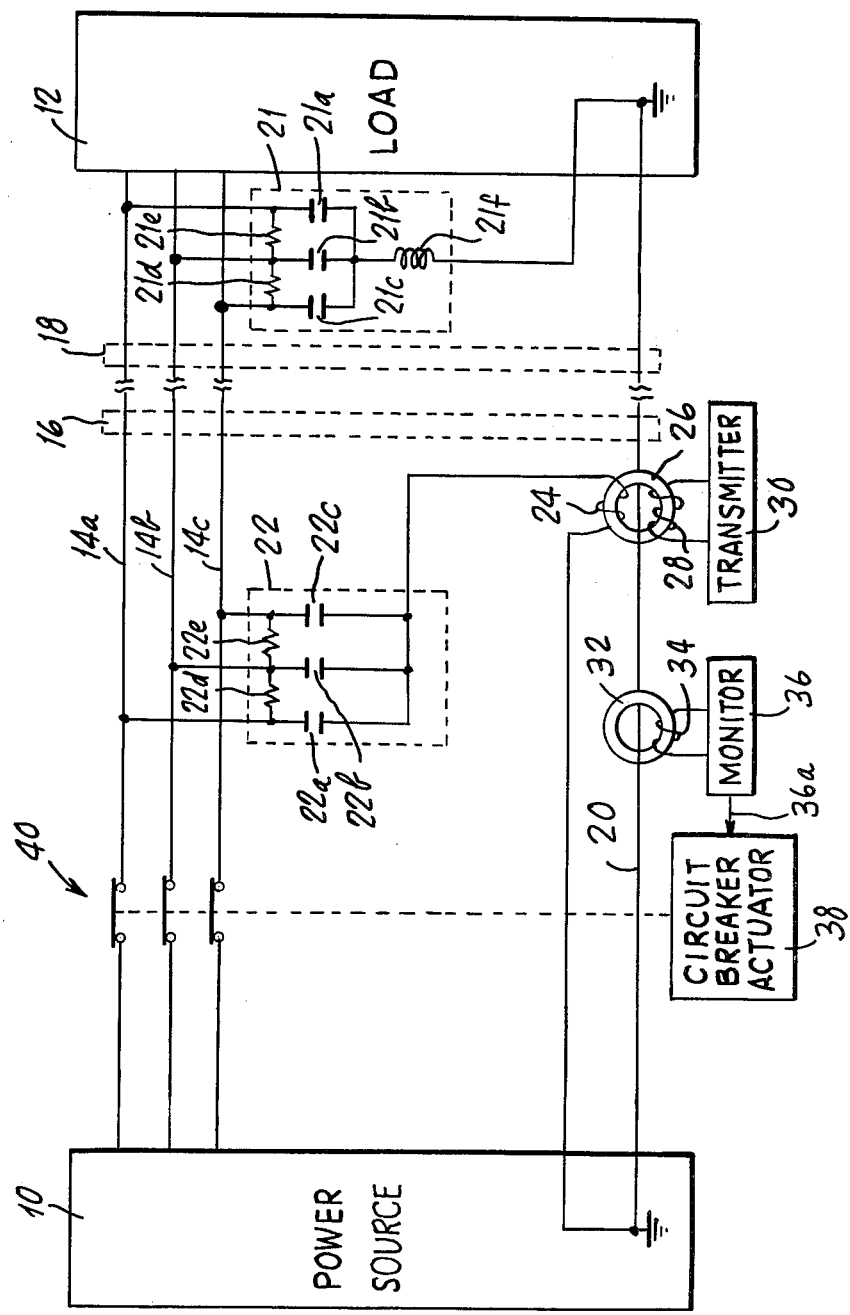

GROUND CONDUCTOR MONITORING SYSTEM

REFERENCE TO RELATED APPLICATION

This is a continuation of application Ser. No. 022,167, filed Mar. 20, 1979, now abandoned.

BACKGROUND AND SUMMARY OF THE INVENTION

The invention is in the field of ground conductor monitoring systems and is particularly directed to a system of this type making efficient use of an audio signal to monitor the quality of at least the ground conductor of a cable system. The invention is particularly advantageous when used in a cable system for supplying power to mining equipment, but is also useful in other systems where it is desirable to monitor the quality of at least the ground conductor of a cable system, typically for the purpose of automatically cutting off power in case of a failure of the ground conductor.

There have been various proposals in the past for monitoring the electrical continuity of a ground conductor or a similar conductor so as to cut off power in case of failure. Some examples of such proposals are discussed in U.S. Pat. Nos. 2,880,377; 3,387,064; 3,746,929; 3,783,340 and 4,075,675. The invention described in greater detail below is believed to be an improvement over such proposals in that it makes more efficient use of the monitoring signal and is believed to provide a greater measure of safety.

In one specific embodiment of the invention a closed loop for a monitoring signal is provided by connecting the load ends of the power conductors of a cable to the load end of the ground conductor through a filter which blocks power but passes the monitoring signal, and connecting the source ends of the power conductors to the source end of the ground conductor through a series circuit of a similar filter and a pick-up coil wound on a transmitter toroid which surrounds the ground conductor. A transmitter coil, also wound on the transmitter toroid, is driven by a suitable transmitter to induce a monitoring signal in the pick-up coil and thus in the closed loop. A monitor toroid also surrounds the ground conductor and has a monitor coil which generates a tripping signal in response to an interruption in the flow of the monitoring signal in the ground conductor. The tripping signal may go to a circuit breaker actuator which cuts off power to the power conductors. The filter at the load end of the cable may be a tuned filter having a series resonance matched to the monitoring signal such that a fault in less than all of the power conductors will raise the impedance the tuned filter presents to the monitoring signal, and the resulting weakening of the monitoring signal will be detected as a ground fault by the monitor.

Other aspects of the invention will become apparent from the more detailed description below of the sole FIGURE, which illustrates an embodiment of the invention partly in schematic and partly in block diagram form.

DETAILED DESCRIPTION

Referring to the sole FIGURE illustrating a particular example of the use of the invention, a power source 10 and a load 12 are connected to each other by power conductors 14a, 14b and 14c and a ground conductor 20. These conductors may connect to a long trailing cable through a source side coupler illustrated schematically at 16 and a load side coupler illustrated schematically at 18. Similarly, these conductors may, in addition, connect to the source and to the load through suitable respective couplers (not shown). All of the couplers may be such that the ground connection is made first and broken last.

In order to provide a closed loop for a monitoring signal, the load ends of the power conductors are connected to the load end of the ground conductor through a filter 21 which passes the monitoring signal but not power, and the source ends of the power conductors are connected to the source end of the ground conductor through the series combination of a similar filter 22 and a booster coil 24 wound on a transmitter toroid 26 which surrounds the ground conductor 20. A transmitter coil 28, also wound on the transmitter toroid, is driven by a transmitter 30 to induce an audio frequency monitoring signal in the pick-up coil 24, and thereby in the closed loop made up of the series connection of the filter 22 and the booster coil 24, the ground conductor 20, the load side filter 21 and the power conductors 14a, 14b and 14c.

The presence of the monitoring signal in this closed loop, and thereby the continuity of this closed loop, is continuously checked with the help of a monitor toroid 32 which also surrounds the ground conductor 20 and has wound on it a monitor coil 34 coupled to a monitor 36, which responds to an interruption of the monitoring signal induced by the ground conductor 20 into the monitor coil 34, to generate a tripping signal at its output 36a. (The term "interruption" is used herein to mean a drop in the level of the monitoring signal induced in the monitor coil 34 below a selected threshold level. This threshold level may, of course, be set by conventional input controls of the monitor 36, which may be a suitable audio receiver.) This tripping signal may go to a circuit breaker actuator 38 which in response opens a circuit breaker schematically illustrated at 40 to cut off power.

In a specific example of using the invention, the power conductors 14a, 14b and 14c may carry three-phase, 60 Hz. power at voltage ranging from a few hundred to over 10,000 volts and at Ampere level of up to, say, about 800 A. Also in a particular example of use of the invention the monitoring signal may be a sinusoidal or a more complex waveform at about 2,650 Hz. Accordingly, the filters 21 and 22 are such that they pass the 2,650 Hz. monitoring signal but not the 60 Hz. power. Thus, the filter 22 may comprise three capacitors 22a, 22b and 22c connected in parallel and a pair of bleeder resistors 22d and 22e. The filter 22 may comprise similar capacitors 21a, 21b and 21c and bleeder resistors 21d and 21e, all connected similarly, but may in addition comprise an inductor 21f, all of its components being tuned to series resonance for 2,650 Hz. When the filter 21 is so tuned, a fault in less than all of the power conductors 14a, 14b and 14c unbalances and detunes it, thereby weakening the monitoring signal passed through the filter 21 to a level below a threshold to which the monitor 34 may be set, whereby the monitor may, in response, generate a tripping signal even in the case where one or two but not all three of the power conductors develop a fault.

In the particular example of use of the invention described above, the capacitors of the filter 22 may be about 1 μF each and the bleeder resistors may be about 1.8 Mohm each, the capacitors of the filter 21 may be about 0.082 μF each, the bleeder resistors of the filter 21 may be about 1.8 Mohm each and the inductor of the filter 21 may be about 15 mH. Each of the coils 28 and 34 may be about 100 turns. The transmitter 30 may be any commercially available transmitter capable of driving the transmitter coil with a sinusoidal or a more complex waveform at a power rating of a few volts to a few tens of volts and tens of mA. Similarly, the monitor 36 can be any commercially available receiver capable of detecting the presence in the monitor coil 34 of a monitoring signal above a selectable threshold of, say, a few mV or a few volts and a few mA. The monitor 36 may include a circuit which detunes it relative to the power frequency of 60 Hz. to thereby make the monitor relatively insensitive to fluctuations at a 60 Hz. frequency or harmonics thereof. The monitoring signal may have any convenient frequency but preferably should not be at a frequency which is close to the power line frequency or to a harmonic thereof. The term "audio" frequency is used here in a broad sense, merely as a way to distinguish the frequency characteristics of the power from those of the monitoring signal. Of course, the filters 21 and 22 should be matched to the particular frequency and waveform characteristics selected for the monitoring signal, and the toroids 26 and 32 must be suitable for the frequency characteristics of the selected monitoring signal, i.e., they must operate efficiently at the selected frequency characteristic. The locations of the toroids 26 and 32 along the ground conductor 20 may be reversed. The transmitter 30 and receiver 36, as well as the circuit breaker actuator 38, may use, as a power source, power derived from the power source 10, perhaps through suitable step-down transformers, or may have independent power source or sources. Typically, the toroids 26 and 32 would be within a few inches or few feet of the power source 10, while the load 12 may be tens or hundreds of feet away from the source 10. The booster coil 24 preferably (but not necessarily) has only a single turn. It is wound in the direction shown, so that it aids the audio signal induced directly in the ground conductor 20 through the toroid 26.

I claim:

1. A ground conductor monitoring system for use with a cable system having power conductors carrying electrical power between a source and a load and a ground conductor connecting the source and the load to each other comprising:

a transmitter toroid surrounding the ground conductor, a transmitter coil wound on the transmitter toroid, a transmitter driving the transmitter coil with a monitoring a-c signal and a booster coil also wound on the transmitter toroid and having said monitoring signal induced therein;

a filter electrically connecting one side of the booster coil to the source side of the power conductors and passing said monitoring signal but not said power, a filter connecting the load side of the power conductors to the load side of the ground conductor and passing said monitoring signal but not said power, and an electrical connection between the other side of the booster coil and the source end of the ground conductor;

whereby the ends of the booster coil are connected to each other through a series circuit comprising the ground conductor, the load side filter, the power conductors and the source side filter, and said monitoring signal induced in the booster coil flows through said series circuit;

a monitor toroid also surrounding the ground conductor and a monitor coil wound on the monitor toroid to have induced therein said monitoring signal flowing in the ground conductor, and a monitor coupled with the monitor coil and responsive to an interruption in the monitoring signal induced in the monitor coil to generate a tripping signal indicative of a possible discontinuity in the ground conductor.

2. A ground conductor monitoring system as in claim 1 including means coupled to said monitor and to said power conductors for disconnecting the power conductor connection between the source and the load in response to the generation of said tripping signal by the monitor.

3. A ground conductor monitoring system as in claim 1 or 2 in which the load-side filter comprises a filter tuned to series resonance for the frequency characteristics of the monitoring signal.

4. A power transmission system having power carrying conductors and a ground conductor, each of said conductors having a source end and a load end, said system further having means for causing and monitoring the flow of a monitoring signal through said ground conductor comprising:

a series circuit of a booster coil and a filter, said series circuit electrically connecting the source ends of the power conductors to the source end of the ground conductor, and a filter electrically connecting the load ends of the power conductors to the load end of the ground conductor, each of said filters passing a monitoring signal having selected characteristics but blocking the flow of power between the power conductors and the ground conductor therethrough, whereby a closed loop is formed of said series circuit, said filter at the load ends of the conductors and the conductors;

a transmitter toroid surrounding the ground conductor, said booster coil being wound on the transmitter toroid, and a transmitter coil also wound on the transmitter toroid, and a transmitter driving the transmitter coil with an a-c signal to thereby induce said monitoring signal in the booster coil and thereby in said closed loop;

a monitor toroid also surrounding the ground conductor and having a monitor coil would thereon to have induced therein said monitoring signal flowing through the ground conductor; and a monitor electrically coupled to the monitor coil and responsive to an interruption of the monitoring signal induced therein to generate a tripping signal indicative of a possible electrical discontinuity in the ground conductor.

5. A system as in claim 4 including tripping means electrically coupled to the monitor and responsive to the generation of said tripping signal thereby to prevent transmission of power over said power conductors.

6. A system as in claim 4 or 5 in which the load-side filter comprises a filter tuned to series resonance for the frequency characteristics of the monitoring signal.

* * * * *